July 1, 1930.  N. L. WARNER  1,769,404
TIRE BUILDING METHOD AND APPARATUS
Filed Sept. 20, 1928  2 Sheets-Sheet 1
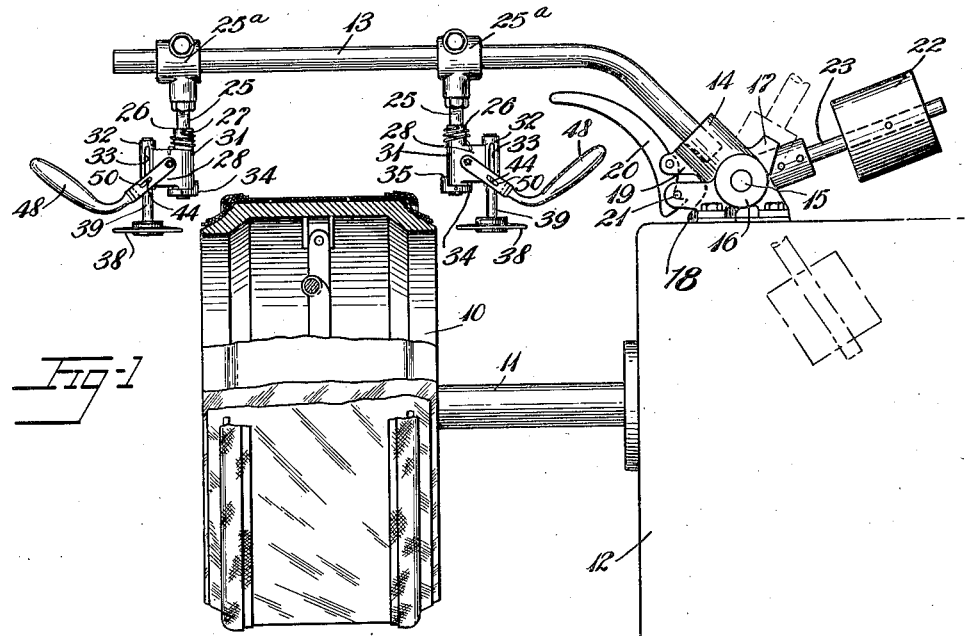
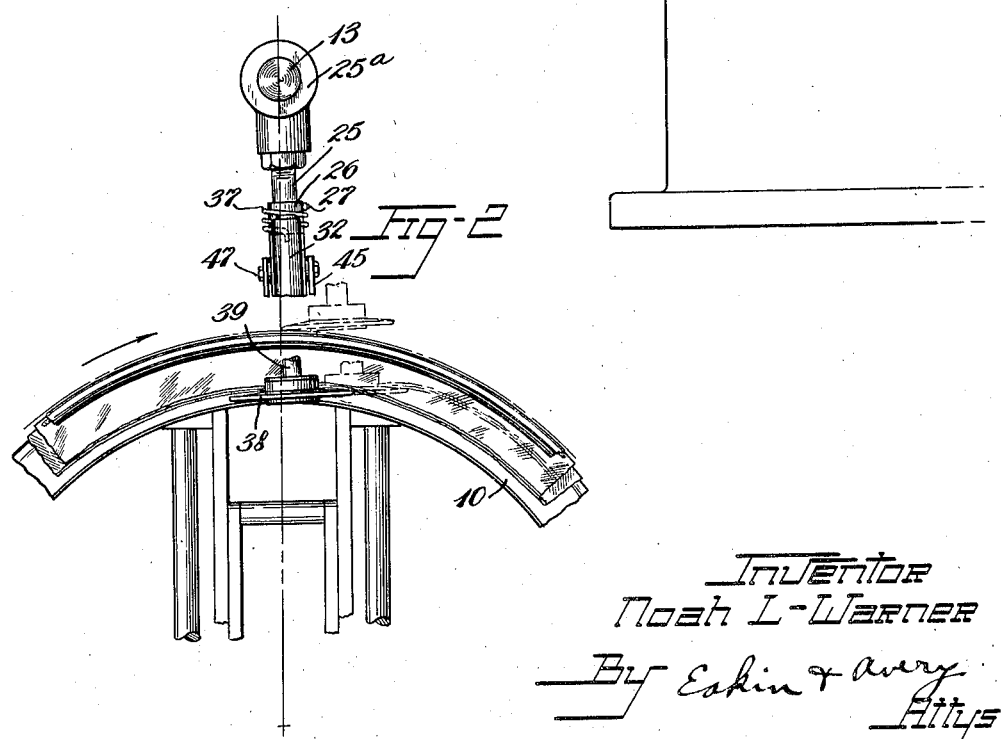
Inventor
Noah L. Warner
By Eskin & Avery
Attys.

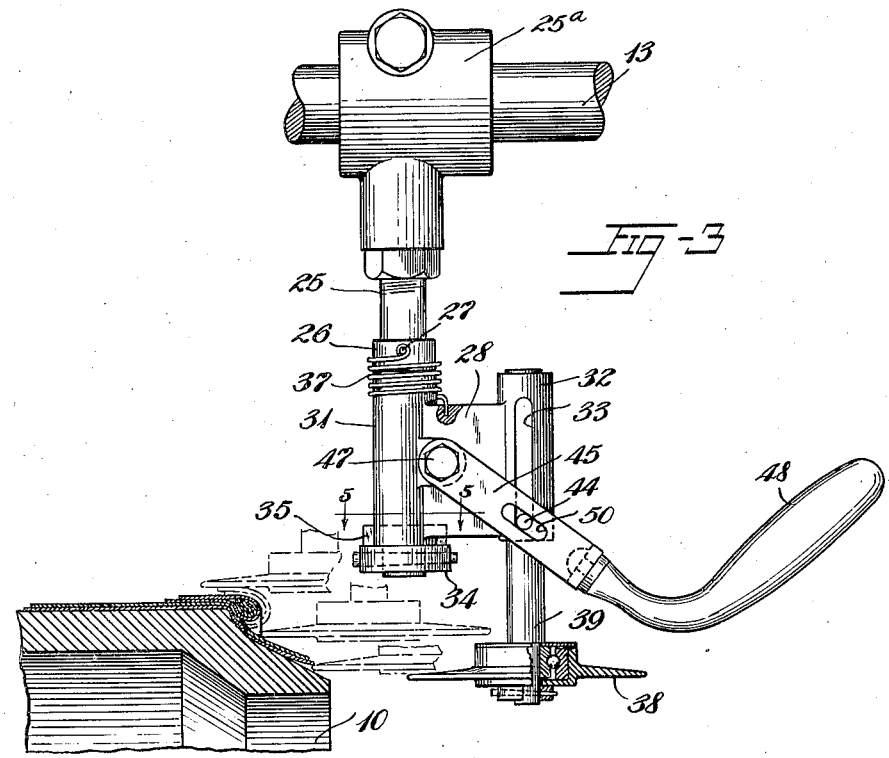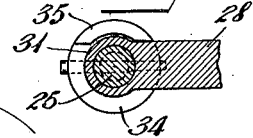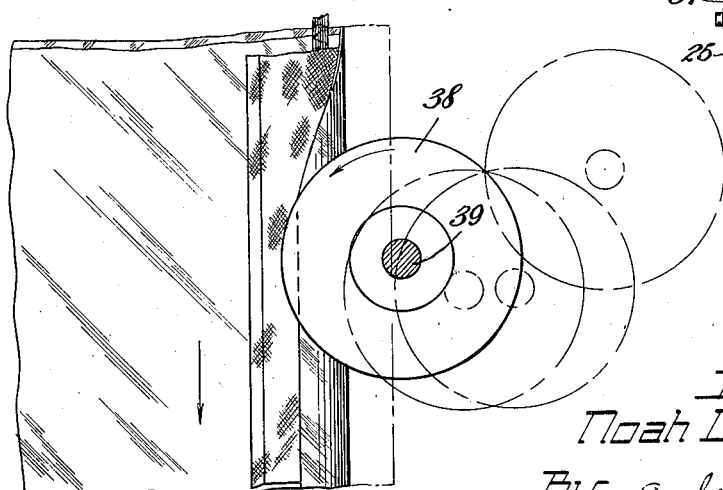

Patented July 1, 1930

1,769,404

UNITED STATES PATENT OFFICE

NOAH L. WARNER, OF AKRON, OHIO, ASSIGNOR TO THE B. F. GOODRICH COMPANY, OF NEW YORK, N. Y., A CORPORATION OF NEW YORK

TIRE-BUILDING METHOD AND APPARATUS

Application filed September 20, 1928. Serial No. 307,117.

My invention relates to tire-building apparatus, and more particularly it relates to apparatus for turning up the side margins of tire fabric around the bead of a tire structure and for stitching the turned over fabric around and over the bead portion thereof.

My chief objects are to provide an improved method and apparatus for performing the turning up and stitching operations while preventing the wrinkling of the fabric margins and the chafing of the rubber coating from the said fabric by the mechanism employed for turning up the said margins.

Of the accompanying drawings:

Fig. 1 is a front elevation of a tire-building drum with work thereon, showing a pair of my improved tire-building tools, a part of the drum and work being sectioned and broken away, showing a pair of my improved tire tools in position for the beginning of the operation.

Fig. 2 is an elevation on a larger scale, from the left of the left hand tire-building tool, as shown in Fig. 1, parts being broken away.

Fig. 3 is a side elevation of one of the tire-building tools in its inoperative position adjacent a tire structure, parts being sectioned and successive operative positions of the tool being indicated in broken lines.

Fig. 4 is a horizontal section through the stem of one of the stitching members, showing the stitching member in contact with the work, other positions of the stitching member with respect to the work being shown in broken lines.

Fig. 5 is a horizontal section on line 5—5 of Fig. 3.

Referring to the drawings, 10 designates a tire-building drum of well-known type rotatably supported on a drum-supporting spindle 11 journaled in the supporting frame 12 of a tire-building machine. A transverse tool-carrying arm 13 is mounted in a socket member 14 secured upon a horizontal rock shaft 15 journaled in brackets 16, 16 upon the frame 12, the rock shaft having its axis of rotation at right angles to that of the drum-supporting spindle 11.

The socket member 14 has a lug 17 adapted to engage the frame 12 in one position of the socket member and act as a stop member to prevent further rotation of the rock shaft in that direction. A second lug 18 on the socket member 14 opposite the lug 17 is adapted to contact with the frame 12 to stop movement of the rock shaft 15 when the latter reaches the position with the tool-carrying member 13 disposed transversely just over the tire drum 10.

The socket member 14 also is formed with an ear portion 19 to which is pivotally secured a latch member 20, the lower end of the latter being adapted to take over a pin 21 extending from a laterally-disposed portion of one of the brackets 16. The arrangement of the rock shaft, tool-carrying arm and latch member is such that the said arm can be selectively positioned horizontally above and transversely of the tire drum 10, and locked in such position, or it can be positioned above the frame 12 at a distance from the tire drum, as shown in broken lines in Fig. 1, where it is held by its own weight and that of a counterweight 22 slidably mounted for adjustment on an arm 23, projecting from the rock shaft 15.

A pair of tool-mounting brackets are so positioned on the carrying arm 13 as to extend downwardly adjacent the respective side margins of a tire structure supported on the tire-building drum 10 when the arm 13 is in operating position.

Each bracket member comprises a depending spindle or pivot rod 25 secured at its upper end to a clamping member 25ª mounted on the arm 13, the spindle 25 being in a slightly non-radial position with respect to the drum 10, as is shown clearly in Fig. 2. The spindle 25 has a shouldered portion 26 adjacent its upper end, the said portion having a spring-anchoring pin 27 mounted thereon.

A tool-supporting bracket 28 is swivelled on the spindle 25, the latter freely extending through a central aperture in a generally-cylindrical end portion 31 of the supporting bracket 28 and having pinned thereon below the bracket 28 a supporting collar 34 formed with a segmental boss 35 adapted to limit pivotal movement of the bracket. A second generally-cylindrical end portion 32 of each bracket 28 has a central, approximately-vertical aperture extending therethrough, preferably parallel to that in end portion 31. The opposite side walls of the end portion 32 have respective vertically-arranged slots 33 extending therethrough. A torsion spring 37 surrounds the spindle 25 and has an end thereof secured to the pin 27 on the shouldered portion of the said spindle, the other end of the spring being secured to the upper surface of the tool-supporting bracket 28.

A stitcher disc 38 is mounted upon the lower end of a vertically-disposed rod 39 which is slidably mounted in the longitudinal aperture in the end portion 32 of the tool-supporting bracket 28.

A yoke member 45 straddles and is pivoted at 47 to the tool-supporting member 28 and is provided with a handle 48. The arms of the yoke are forked with longitudinally-disposed slots such as the slot 50 and a pin 44 is mounted in the spindle 39 and extends freely through the slots 33 in the tool-supporting member 28 and through the slots 50 in the yoke member 45 so that the rod 39 and the stitcher member 38 thereon can be raised and lowered and can be swung in an arc around the spindle 25 by means of the handle 48.

In beginning the operation of my improved apparatus, a partly-built tire structure being in position on the rotating drum 10 with bead margins of some of its plies ready to be turned up about the bead, the tool-carrying arm 13 is positioned by the operator with the tool-mounting brackets extending downward adjacent the respective side margins of the tire structure. The force of the torsion spring 37 presses the tool-supporting bracket 28 against one side of the shoulder 35 of the collar 34 and keeps the stitcher disc 38 in its inoperative position on the opposite side of the spindle 25 from the rotating drum and tire structure. The yoke 45 and handle 48 are in their lowermost positions, with the pin 44 associated therewith resting upon the bottom end wall of the longitudinal slot 33 in the end portion 32 of the tool-supporting bracket 28.

The operator then swings the bracket 28 and the parts carried thereby around the spindle 25 by means of the handle 48 so as to bring the stitcher disc into contact with the moving outer edge of the under surface of the fabric margin and with the rotating drum. This causes rotation of the said stitcher member. At the same time the operator by exerting upward and inward pressure upon the handle 48 causes the stitcher disc to be moved upwardly and toward the middle of the tire structure along the beveled margins of the tire-building drum, as clearly shown in Fig. 3. The construction is such that as the stitcher moves along under the fabric plies in a direction toward the middle of the tire structure it plows or turns up the fabric margin away from the drum and, because of the non-radial relation of the stitcher's axis to the drum, exerts a pronounced radially-outward wiping action upon the surface of the said margin, resulting from the non-tangential relation of the disc to the drum, so as to prevent both wrinkling of the fabric and digging of the stitcher into the same.

Movement of the stitcher inwardly and upwardly in contact with the drum is continued under the pressure applied by the operator through the handle 48 until it is strongly resisted by the bead of the tire structure and the direction of movement of the stitcher is then changed by the operator to follow the lateral contour of the bead to turn over the fabric margin and to press it snugly against the laterally-facing side of the bead, with a radially-outward wiping action. Then the stitcher disc is moved inwardly along the outer surface of the bead under downward pressure applied by the operator through handle 48, which causes the free fabric to be smoothly pressed in place without wrinkles, the tilt of the disc's axis resulting in a strong wiping of the fabric margin toward the middle plane of the tire structure without wiping of the fabric in the opposite direction in the region of the off-running portion of the disc. The several described wiping effects resulting from the non-tangential feature of the disc will be clearly understood upon examination of Fig. 2, the tire structure rotating in the direction indicated by the arrow.

The degree of stitching pressure to be used and the direction in which it is to be applied is within the control of the operator at all times although the mounting of the disc is such that it is held against displacement circumferentially of the drum chiefly by the spindle 25. Tearing or digging of the fabric margins is prevented by the use of the freely-rotating stitcher disc and of a yielding pressure so within the control of the operator as to permit substantially instantaneous modification of the degree or direction of application of the pressure.

It will be obvious that the two stitcher members can be operated either at different times or simultaneously.

My invention is susceptible of modification within the scope of the appended claims.

I claim:

1. A method of securing the fabric margin of a tire structure around and upon the bead portion thereof which comprises folding and stitching a ply margin of the tire structure from the toe of the bead to the side wall portion of the structure with a constant wiping of the said margin at the stitching position in a direction toward the edge of the ply.

2. A method of securing the fabric margin of a tire structure around and upon the bead portion thereof which comprises turning up a ply margin of the tire structure around the bead portion and stitching the turned up ply margin from the toe of the bead to the side wall portion of the tire structure and constantly wiping the said margin at the stitching position in a direction toward the edge of the ply during the said operations.

3. Tire-building apparatus comprising a rotatably-supported tire form, a tool mounted adjacent thereto and means associated with the tool for moving it transversely about the bead of a tire structure on the form, the single tool being so constructed and arranged as to fold and stitch a ply margin of the tire structure from the toe of the bead to the side wall portion of the structure with a constant wiping of the said margin in a direction toward the latter's edge.

4. Apparatus as defined in claim 3 in which the said tool is a rotary member.

5. Tire-building apparatus comprising a rotatably-supported tire-building form, a tire tool positionable at a side thereof, a mounting for the tool pivoted on an axis approximately radial with relation to the form, the tool being mounted to slide in a direction approximately radial with relation to the form, and a single hand lever mounted to engage the said mounting for effecting the pivotal movement of the latter when moved in one direction and having connection to the tool to effect the said sliding movement thereof.

6. Tire-building apparatus comprising a rotatably-supported tire-building form and a tire tool associated therewith for operation upon a tire structure built upon the form, the tool being mounted to be moved along the surface of the form toward the toe of the bead of the tire-structure and then transversely about the bead to lift from the form the fabric margin of the tire structure and wrap it about the bead, the tool by its mounting being so held in non-tangential relation to the form as to effect during the movement of the tool toward the toe of the bead a progressive wiping of the fabric in a direction opposite to that of the said movement of the tool, and to effect during its movement along another part of its path a pressing and a wiping of the fabric in the same direction as that of the last said movement of the tool.

7. Tire-building apparatus comprising a tire-building form and a tool associated therewith for operation upon a tire structure being built upon the form and having a bead portion, the tool being mounted for movement under the fabric margin of the tire structure to the toe of the bead and then transversely about the bead portion of the tire structure, the tool by its mounting being so held in non-tangential relation to the said fabric margin and bead as to effect a wiping of the fabric in a direction opposite to that of the movement of the tool during the latter's movement toward the toe of the bead.

8. Apparatus as defined in claim 6 in which the tool is a rotatable disc-shaped member.

In witness whereof I have hereunto set my hand this 14th day of September, 1928.

NOAH L. WARNER.